United States Patent
Tai et al.

(10) Patent No.: US 12,198,714 B2
(45) Date of Patent: Jan. 14, 2025

(54) VOICE SIGNAL ANALYSIS METHOD AND DEVICE AND CHIP DESIGN METHOD AND DEVICE

(71) Applicant: Industrial Technology Research Institute, Hsinchu (TW)

(72) Inventors: Liang-Hsuan Tai, Hsinchu (TW); Hong-Yu Chen, Hsinchu (TW); Yen-Ting Wu, Hsinchu County (TW); Ting-Yu Wang, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 289 days.

(21) Appl. No.: 17/850,906

(22) Filed: Jun. 27, 2022

(65) Prior Publication Data

US 2023/0368810 A1 Nov. 16, 2023

(30) Foreign Application Priority Data

May 12, 2022 (TW) .................. 111117761

(51) Int. Cl.
*G10L 25/30* (2013.01)
*G10L 17/26* (2013.01)
(Continued)

(52) U.S. Cl.
CPC .............. *G10L 25/30* (2013.01); *G10L 17/26* (2013.01); *G10L 21/0208* (2013.01); *H04B 1/40* (2013.01)

(58) Field of Classification Search
CPC ..... G10L 25/30; G10L 17/26; G10L 21/0208; G10L 25/66; G10L 25/51; H04B 1/40;
(Continued)

(56) References Cited

U.S. PATENT DOCUMENTS 8,332,793 B2  12/2012  Bose
10,783,405 B2  9/2020  Rohde et al.
(Continued)

FOREIGN PATENT DOCUMENTS

CN   107438398   12/2017
CN   106971042   10/2019
(Continued)

OTHER PUBLICATIONS

"Office Action of Taiwan Counterpart Application", issued on Feb. 22, 2023, p. 1-p. 5.
(Continued)

*Primary Examiner* — Huyen X Vo
(74) *Attorney, Agent, or Firm* — JCIPRNET

(57) ABSTRACT

The disclosure relates to a voice signal analysis method and device and a chip design method and device. The voice signal analysis method includes: in a first updating gradient, training a resolution recovery model by using first voice training data meeting a same grouping condition in multiple mission sets; in a second updating gradient, training the resolution recovery model by interleavingly using second voice training data meeting different grouping conditions in the mission sets; iteratively executing the first and second updating gradients to set an initial model parameter of the resolution recovery model; and recovering a high-resolution snore signal from a low-resolution snore signal by using the resolution recovery model. The low-resolution snore signal has a lower resolution than the high-resolution snore signal.

9 Claims, 9 Drawing Sheets

(51) Int. Cl.
*G10L 21/0208* (2013.01)
*H04B 1/40* (2015.01)

(58) Field of Classification Search
CPC ... G06F 30/392; G06F 30/398; A61B 5/4803; A61B 5/6803; A61B 5/00; A61B 5/6898; A61B 5/7264; A61B 5/7267; G06N 3/00; G06N 5/00; G03F 1/36
See application file for complete search history.

(56) References Cited

U.S. PATENT DOCUMENTS

| | | | |
|---|---|---|---|
| 10,848,855 B2 | 11/2020 | Shiao et al. | |
| 2015/0073306 A1 | 3/2015 | Abeyratne et al. | |
| 2017/0105679 A1 | 4/2017 | Gil | |
| 2018/0235537 A1 | 8/2018 | Whiting et al. | |
| 2018/0322386 A1* | 11/2018 | Sridharan | G06F 9/54 |
| 2019/0350532 A1 | 11/2019 | LeBoeuf et al. | |
| 2020/0118000 A1* | 4/2020 | Schmidt | G06F 9/546 |
| 2020/0293888 A1* | 9/2020 | Meyerson | G06N 3/084 |
| 2021/0124865 A1 | 4/2021 | Dai et al. | |
| 2022/0218273 A1* | 7/2022 | Barnacka | A61B 7/003 |

FOREIGN PATENT DOCUMENTS

| | | |
|---|---|---|
| CN | 112185352 | 1/2021 |
| CN | 113689867 | 11/2021 |
| JP | 2020506491 | 2/2020 |
| TW | 201121495 | 7/2011 |
| TW | I749547 | 12/2021 |
| WO | 2021189990 | 9/2021 |

OTHER PUBLICATIONS

"Office Action of Taiwan Counterpart Application", issued on Nov. 21, 2023, p. 1-p. 5.

* cited by examiner

VOICE SIGNAL ANALYSIS METHOD AND DEVICE AND CHIP DESIGN METHOD AND DEVICE

CROSS-REFERENCE TO RELATED APPLICATION

This application claims the priority benefit of Taiwan application serial no. 111117761, filed on May 12, 2022. The entirety of the above-mentioned patent application is hereby incorporated by reference herein and made a part of this specification.

TECHNICAL FIELD

The disclosure relates to a voice signal analysis method, a technique for chip design, and a chip design device.

BACKGROUND

Following the prosperous development of smart earphones, incorporating physiological signal sensing in smart earphones is gaining more and more popularity. One of the cutting edge applications is related to snore treatment. However, snore sensing for a long time is quite power-consuming. Therefore, the market is eying a physiological sensing technique with low power consumption. However, when trying to lower power consumption using the conventional super resolution method, the recovered signal is prone to be erroneous, leading to a low accuracy of the physiological signal calculated accordingly. For example, in detecting snore by using a smart earphone, it is conventional to simply lower the sampling frequency to reduce power consumption. However, a super resolution method needs to be adopted alongside to train a recovery model between a low sampled signal and a high sampled signal and thereby recover a signal with a high sampling frequency. However, the recovery according to the conventional super resolution method may be inaccurate. Therefore, how to realize a physiological sensing technique with low power consumption remains an issue to work on.

Meanwhile, a small-sized electronic product which fits the ear canal and meets the consideration for human factors engineering is also popular on the market. Heuristic algorithms have been used conventionally as a means to reduce chip size. However, by adopting heuristic algorithms, it is easy to render a local minimum (i.e., a second-minimum area). Therefore, how to reduce chip size has also been an issue to work on.

SUMMARY

The disclosure provides a voice signal analysis method, a voice signal analysis device, a technique for chip design, and a chip design device capable of reducing power consumption and signal errors, facilitating accuracy, and reducing chip size.

An embodiment of the disclosure provides a voice signal analysis method. The method includes: in a first updating gradient, training a resolution recovery model in an audio processing chip by using multiple first voice training data meeting a same grouping condition in multiple mission sets; in a second updating gradient, training the resolution recovery model by interleavingly using second voice training data meeting different grouping conditions in the mission sets; iteratively executing the first updating gradient and the second updating gradient to set an initial model parameter of the resolution recovery model; and recovering a high-resolution snore signal from a low-resolution snore signal by using the resolution recovery model. A resolution of the low-resolution snore signal is lower than a resolution of the high-resolution snore signal.

Another embodiment of the disclosure provides a voice signal analysis device including an audio processing chip and a storage circuit. A resolution recovery model is built is built in the audio processing chip. The storage circuit is coupled to the audio processing chip and configured to store multiple mission sets. The audio processing chip is configured to: in a first updating gradient, train the resolution recovery model by using multiple first voice training data meeting a same grouping condition in the mission sets; in a second updating gradient, train the resolution recovery model by interleavingly using multiple second voice training data meeting different grouping conditions in the mission sets; iteratively execute the first updating gradient and the second updating gradient to set an initial model parameter of the resolution recovery model; and recover a high-resolution snore signal from a low-resolution snore signal by using the resolution recovery model. A resolution of the low-resolution snore signal is lower than a resolution of the high-resolution snore signal.

Another embodiment of the disclosure provides a chip design method that is provided for a chip layout prediction model in a chip design device. The chip design method includes: executing model rebuilding according to multiple constraints; and iteratively looking for a chip layout design corresponding to an audio processing chip through multiple decision paths to manufacture the audio processing chip. The chip layout design meets a minimum layout area of the audio processing chip.

Another embodiment of the disclosure provides a chip design device including a storage circuit and a processor. The storage circuit is configured to store a chip layout prediction model. The processor is coupled to the storage circuit. The processor is configured to run the chip layout prediction model to: execute model rebuilding according to multiple constraints; and iteratively look for a chip layout design corresponding to an audio processing chip through multiple decision paths to manufacture the audio processing chip. The chip layout design meets a minimum layout area of the audio processing chip.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

According to the super resolution method, a low-resolution snore may be added with a random initialization model parameter and entered into a first layer of a neural network (i.e., to learn micro-features including weight calculation, deviation calculation, and excitation function calculation) and a second layer of neural network (i.e., to learn macro-features including weight calculation, deviation calculation, and excitation function calculation) to generate a high-resolution snore. However, when the power consumption is reduced, the recovered signal is prone to be erroneous, leading to a low accuracy in calculation of a physiological signal.

According to the embodiments of the disclosure, a dual-gradient learning generalization method is adopted to replace random initialization, thereby reducing power consumption and signal errors and facilitating accuracy.

Figure 1A:
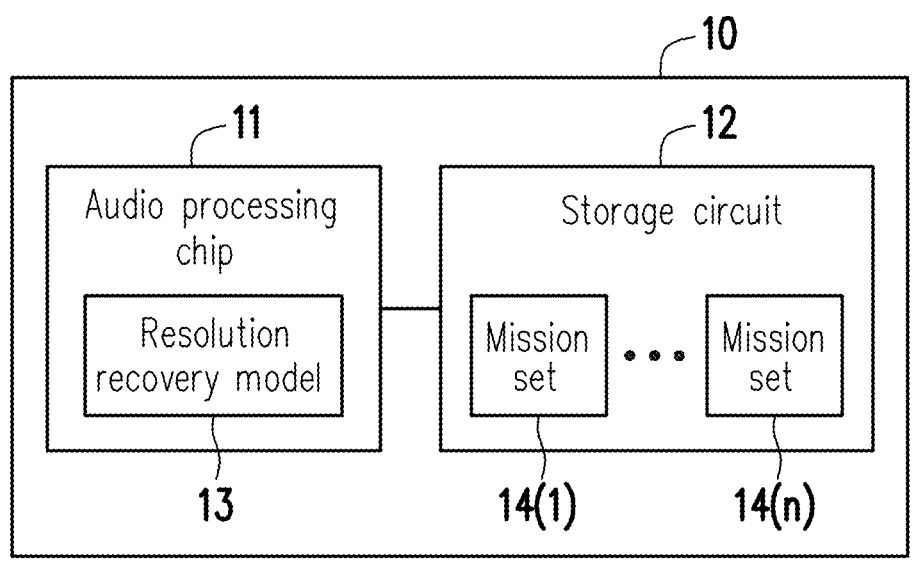
FIG. 1A is a schematic diagram illustrating a voice signal analysis device according to an embodiment of the disclosure.

FIG. 1A is a schematic diagram illustrating a voice signal analysis device according to an embodiment of the disclosure. Referring to FIG. 1A, a voice signal analysis device 10 may include various electronic devices with a voice signal processing function, such as a wired earphone, a wireless earphone, a smart phone, a tablet computer, a laptop computer, or a digital voice recorder. In addition, the types of the voice signal analysis device 10 are not limited to the above.

The voice signal analysis device 10 includes an audio processing chip 11 and a storage circuit 12. The audio processing chip 11 is configured to process a voice signal. For example, the audio processing chip 11 may include a central processing unit (CPU), or a programmable microprocessor of common usage or specific usage, a digital signal processor (DSP), a programmable controller, an application specific integrated circuit (ASIC), a programmable logic device (PLD), other similar devices, or a combination thereof. In an embodiment, the audio processing chip 11 may also handle a portion or the entirety of the operation of the audio signal analysis device 10.

The storage circuit 12 is coupled to the audio processing chip 11. The storage circuit 12 is configured to store data. For example, the storage circuit 12 may include a volatile storage circuit and a non-volatile storage circuit. The volatile storage circuit is configured to store data in a volatile manner. For example, the volatile storage circuit may include a random access memory (RAM) or a similar volatile storage medium. The non-volatile storage circuit is configured to store data in a non-volatile manner. For example, the non-volatile storage circuit may include a read-only memory (ROM), a solid-state drive (SSD), and/or a conventional hard disk drive (HDD), and/or a similar non-volatile storage medium.

The voice signal analysis device 10 may further include a power management circuit for managing the power of the audio signal analysis device 10, various sensors, and various input/output (I/O) interfaces. The disclosure is not particularly limited by the types of the sensors and the I/O interfaces included in the voice signal analysis device 10.

The audio processing chip 11 may include a resolution recovery model 13. For example, the resolution recovery model 13 may be built in the audio processing chip 11. The resolution recovery model 13 may serve to recover a voice sampled signal (also referred to as "second voice sampled signal") with a resolution (also referred to as "second resolution") from a voice sampled signal (also referred to as "first voice sampled signal") with another resolution (also referred to as "first resolution"). The resolution of the second voice sampled signal is higher than the resolution of the first voice sampled signal. For example, after a voice signal (also referred to as "original voice signal") is sampled to obtain the first voice sampled signal with a lower resolution, the resolution recovery model 13 may recover the second voice sampled signal with a higher resolution from the first voice sampled signal. For example, the resolution of the second voice sampled signal may be close to or even same as the resolution (also referred to as "original resolution") of the original voice signal. In an exemplary embodiment, the first voice sampled signal includes a low-resolution snore signal and/or the second voice sampled signal includes a high-resolution snore signal. The resolution of the low-resolution snore signal is lower than the resolution of the high-resolution snore signal.

The resolution recovery model 13 may include one or more neural networks. Various neural networks, such as a convolutional neural network (CNN) and/or a feed forward deep neural network (FFDNN), and/or deep learning models may be used to realize the neural network, and such neural work may be modified as needed.

The storage circuit 12 may be configured to store multiple mission sets 14(1) to 14(n). Each of the mission sets 14(1) to 14(n) may include at least one voice training data to train the resolution recovery model 13. For example, the voice training data may include sampled data of voice signals (also referred to as "voice sampled data"). In addition, the disclosure is not particularly limited by the total number of the mission sets 14(1) to 14(n).

The voice training data in the mission sets 14(1) to 14(n) may be grouped according to specific grouping conditions (also referred to filter conditions). For example, the grouping conditions may include conditions, such as age, gender, and nationality, for distinguishing voice sensing targets of different types. In addition, the grouping conditions are not limited to the above. Voice training data meeting the same grouping condition may be stored in the same mission set among the mission sets 14(1) to 14(n). For example, the mission set 14(1) may serve to store voice training data of voice sensing targets whose ages range from 15 to 18 years old, the mission set 14(2) may serve to store voice training data of voice sensing targets whose ages range from 19 to 22 years old, the mission set 14(3) may serve to store voice training data of male voice sensing targets, and the mission set 14(4) may serve to store voice training data of female voice sensing targets. The grouping conditions may be modified based on practical needs and the disclosure is not particularly limited by the grouping conditions. In addition, different mission sets in the mission sets 14(1) to 14(*n*) respectively store voice training data of different grouping conditions. In addition, the audio processing chip 11 may iteratively execute updating operations of different types of updating gradients according to the mission sets 14(1) to 14(*n*) to set an initial parameter (also referred to as "initial model parameter") of the resolution recovery model 13.

Figure 1B:
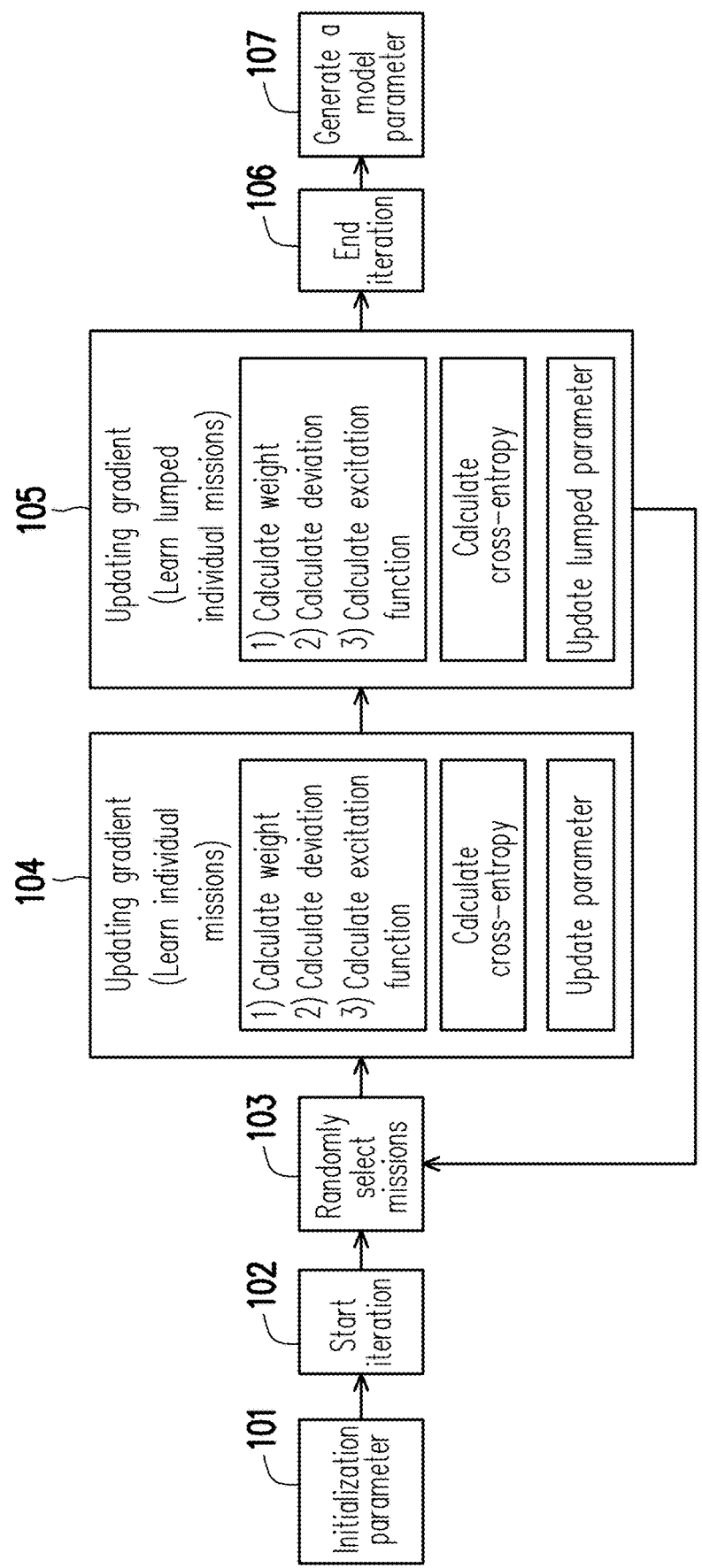
FIG. 1B is a schematic diagram illustrating a flow of setting an initial model parameter of a resolution recovery model according to an embodiment of the disclosure.

FIG. 1B is a schematic diagram illustrating a flow of setting an initial model parameter of a resolution recovery model according to an embodiment of the disclosure. Referring to FIG. 1B, in Step 101, the audio processing chip 11 may set an initialization parameter of the resolution recovery model 13. In Step 102, iteration starts. In Step 103, the audio processing chip 11 may randomly select missions for training from the mission sets 14(1) to 14(*n*) of FIG. 1A.

In Step 104, the audio processing chip 11 may execute an operation of an updating gradient (also referred to "first updating gradient" (learning individual missions)). In Step 104 (i.e., the first updating gradient), the audio processing chip 11 may train the resolution recovery model 13 by using multiple voice training data (also referred to as "first voice training data") meeting the same grouping condition among the mission sets 14(1) to 14(*n*) to learn audio features of individual missions. For example, in Step 104, all or at least some of the voice training data in the mission set 14(*i*) may be sequentially input to the resolution recovery model 13. Accordingly, the audio recovery model 13 continuously learns the voice features of the individual missions in the learning mission set 14(*i*). After the training of the analysis recovery model 13 by using all or at least some of the voice training data in the mission set 14(*i*) is completed, all or at least some of the voice training data in the mission set 14(*j*) may be sequentially input to the resolution recovery model 13. Accordingly, the audio recovery model 13 continuously learns the voice features of the individual missions in the learning mission set 14(*j*).

In an embodiment, in Step 104, the audio processing chip 11 may execute weight calculation, deviation calculation, and excitation function calculation related to the resolution recovery model 13 according to the audio features of the individual missions learned by the resolution recovery model 13. Then, the audio processing chip 11 may calculate cross-entropy and update the parameter of the resolution recovery model 13 according to a result of calculation.

Figure 1C:
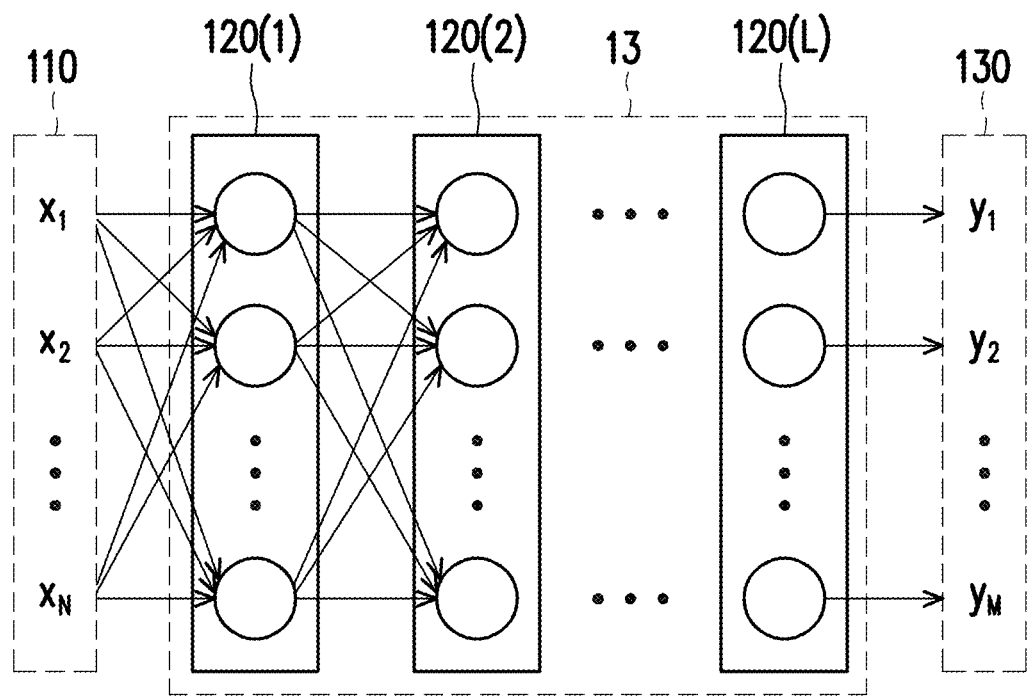
FIG. 1C is a schematic diagram illustrating a computation framework of the resolution recovery model according to an embodiment of the disclosure.

FIG. 1C is a schematic diagram illustrating a computation framework of the resolution recovery model according to an embodiment of the disclosure. Referring to FIG. 1C, an input signal 110 may include voice training data and be input to the resolution recovery model 13. The input signal 110 may include multiple input values $x_1$ to $x_1$ to $x_N T$. The resolution recovery model 13 may perform iterative computing on the voice training data 110 by using computation models 120(1) to 120(L) and generate an output signal 130. The output signal 130 include multiple output values $y_1$ to $y_M$. N and M are positive integers, and M is greater than N. In other words, the total number of the output values $y_1$ to $y_M$ is greater than the total number of the input values $x_1$ to $x_N$. Accordingly, the resolution recovery model 13 may recover the output signal 130 with a higher resolution from the input signal 110 with a lower resolution. In addition, in the process of training the resolution recovery model 13, the computation parameter adopted by the resolution recovery mode 13 may be constantly updated to look for an optimal parameter.

The resolution recovery model 13 may include the multiple computation models 120(1) to 120(L). For example, the number of layers of the computation models 120(1) to 120(L) is L, and L may be an arbitrary positive integer greater than 1. A computation model 120(*k*) in the computation models 120(1) to 120(L) calculates the excitation function according to a weight value W(k) and a deviation value b(k), and k is between 1 and L. For example, the computation model 120(*k*) may calculate the excitation function according to Formulae (1.1) and (1.2) as follows:

$$\sigma(x)=\max(0, x) \quad (1.1)$$

$$x=W(k)\times x_i+b(k) \quad (1.2)$$

Formula (1.1) may represent the excitation function. In Formula (1.2), W(k) represents the weight value adopted by the computation model 120(*k*), b(k) represents the deviation value adopted by the computation model 120(*k*), and $x_i$ represents the input value at a computation node in the computation model 120(*k*). In addition, after generating the output signal 130, the audio processing chip 11 may calculate cross-entropy according to Formula (1.3) as follows.

$$CE=-\Sigma_i{}^c t_i \times \log((f(s)n) \quad (1.3)$$

In Formula (1.3), CE represents cross-entropy. In addition, CE reflects a difference between the output signal 130 generated by the resolution recovery model 13 and validation data. The audio processing chip 11 may constantly update (e.g., adjust) the computation parameter (e.g., the weight value and the deviation) adopted by the resolution recovery model 13 according to the calculation result of Formula (1.3) until an optimal parameter is found.

Referring to FIG. 1B again, after Step 104, in Step 105, the audio processing chip 11 may execute an operation of another updating gradient (also referred to as "second updating gradient" (learning lumped individual missions)). In Step 105 (i.e., the second updating gradient), the audio processing chip 11 may interleavingly train the resolution recovery model 13 by using multiple voice training data (also referred to as "second voice training data") meeting different grouping conditions among the mission sets 14(1) to 14(*n*). For example, in the second updating gradient, a voice training data in the mission set 14(*p*) may be firstly input to the resolution recovery model 13 to train the resolution recovery model 13. Then, a voice training data in the mission set 14(*q*) may be input to the resolution recovery model 13 to train the resolution recovery model 13, where p is not equal to q. Following the same principle, in the second updating gradient, a greater number of voice training data belonging to different mission sets may be used interleavingly to train the resolution recovery model 13, thereby facilitating as much as possible the accuracy of recovering the voice signals of different types of voice sensing targets by using the resolution recovery model 13.

For example, in Step 105, the audio processing chip 11 may execute weight calculation, deviation calculation, and excitation function calculation related to the resolution recovery model 13 according to the audio features of the lumped individual missions (i.e., missions across mission sets) learned by the resolution recovery model 13. Then, the audio processing chip 11 may calculate cross-entropy and update the lumped parameter of the resolution recovery model 13 according to a result of calculation. Details relating to the operation may be referred to the description about Step 104 and FIG. 1C, and therefore will not be repeated in the following.

The audio processing chip 11 may iteratively execute Steps 104 and 105 to set an initial parameter (i.e., initial model parameter) of the resolution recovery model 13. For example, after iteratively executing Step 104 and Step 105 by completely using the voice training data in the mission sets 14(1) to 14(n) to obtain the optimal (or favorable) parameter, the audio processing chip 11 may determine that the iteration ends in Step 106 and generate the model parameter to be used (i.e., the initial model parameter) in Step 107. Then, the resolution recovery model 13 may recover the voice sampled signal based on the initial model parameter. In an embodiment, the process of setting the initial parameter (i.e., the initial model parameter) of the resolution recovery model 13 may also be referred to as a dual-gradient learning generalization method.

In an embodiment, the missions are used randomly to train the neural network model, and the initialization parameter of the model may be set randomly. Therefore, even after training, the neural network model is still unable to effectively facilitate the accuracy of recovering the voice signal. However, in the embodiment of the disclosure, by obligatorily adopting the customized, stage-based model training mechanism, after the training is completed, the resolution recovery model 13 is able to accurately recover a high-resolution snore signal (i.e., the second voice sampled signal) from a low-resolution snore signal (i.e., the first voice sampled signal) based on a favorable initial model parameter, and the recovery error can be significantly reduced.

In an embodiment, the low-resolution snore signal (i.e., the first voice sampled signal) is obtained by sampling the original voice signal using a sampling mode with a lower power consumption. Accordingly, the power (e.g., device power consumption) consumed by the voice signal analysis device 10 for sampling the voice signal can be effectively reduced. In addition, by facilitating the efficiency of the resolution recovery model 13 recovering the low-resolution snore signal (i.e., the first sampled voice signal), the resolution recovery model 13 is able to output a high-resolution snore signal (i.e., the second voice sampled signal) close to or even nearly the same as the original voice signal for subsequent analysis. Accordingly, in the entire process of sampling (i.e., sensing) and recovering the voice signal, the power consumption of the voice signal analysis device 10 is reduced significantly, whereas the accuracy of analyzing the voice signal is still maintained or even increased.

In an embodiment, during the process of iteratively executing the first updating gradient (i.e., learning individual missions) and the second updating gradient (i.e., learning lumped individual missions), some of the parameters (e.g., weight value) adopted by the neural network in the resolution recovery model 13 may be constantly updated to reduce the prediction error of the resolution recovery model 13 and/or facilitate the prediction accuracy of the resolution recovery model 13. In addition, the audio processing chip 11 may evaluate the prediction error of the resolution recovery model 13 in each iteration according to the excitation function and the cross-entropy commonly used in neural networks, deep learning, and machine learning as well as the parameter updating (in "learning individual missions") or lumped parameter updating (in "learning lumped individual missions"), until the iterative computation ends. Relevant operation details have been described above and therefore will not be repeated in the following.

Figure 2:
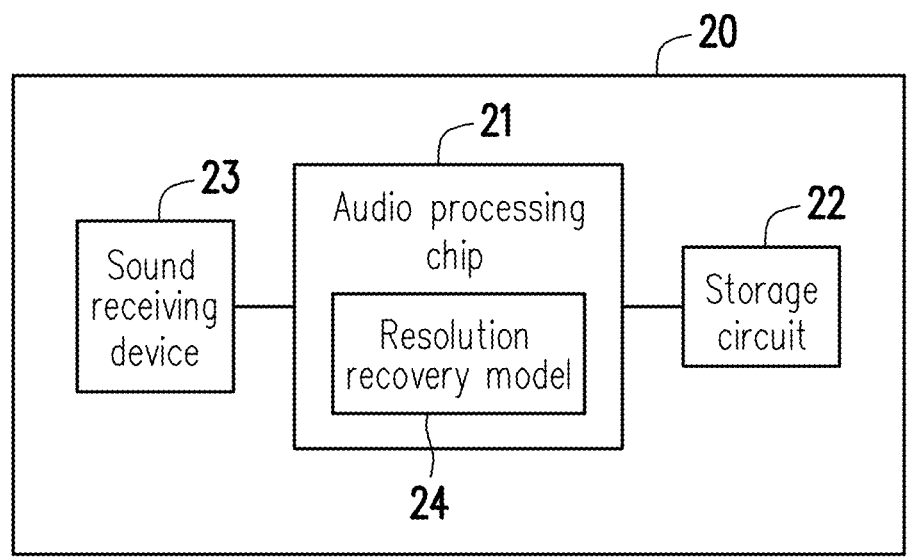
FIG. 2 is a schematic diagram illustrating a voice signal analysis device according to an embodiment of the disclosure.

FIG. 2 is a schematic diagram illustrating a voice signal analysis device according to an embodiment of the disclosure. Referring to FIG. 2, a voice signal analysis device 20 may include various electronic devices with voice signal reception and processing functions, such as a wired earphone, a wireless earphone, a smart phone, a tablet computer, a laptop computer, or a digital voice recorder. In addition, the types of the voice signal analysis device 20 are not limited to the above.

The voice signal analysis device 20 may include an audio processing chip 21, a storage circuit 22, a sound receiving device 23, and a resolution recovery model 24. The audio processing chip 21, the storage circuit 22, and the resolution recovery model 24 are respectively the same as or similar to the audio processing chip 11, the storage circuit 12, and the resolution recovery model 13.

The sound receiving device 23 is coupled to the audio processing chip 21. The sound receiving device 23 is configured to receive a voice signal (i.e., the original voice signal). For example, the sound receiving device 23 may include an audio receiving device such as a microphone. The original voice signal may include a voice signal made by a target person, such as an ambient sound. For example, the original voice signal may reflect the sound of breathing when the target person is asleep or at another moment.

The audio processing chip 21 may receive the original voice signal through the sound receiving device 23. Then, the audio processing chip 21 may sample the original voice signal based on a default sampling frequency (also referred to as "first sampling frequency") to obtain the low-resolution snore signal. Then, the audio processing chip 21 may recover the high-resolution snore signal from the low-resolution snore signal through the resolution recovery model 24. For example, the low-resolution snore signal corresponds to the first sampling frequency, and the high-resolution snore signal corresponds to another sampling frequency (also referred to as "second sampling frequency"). In addition, the second sampling frequency is higher than the first sampling frequency.

In an embodiment, the first sampling frequency is positively correlated with the power consumption at the time when the audio processing chip 21 samples (i.e., senses) the original voice signal. That is, the higher the first sampling frequency, the greater the power consumption when the audio processing chip 21 samples the original voice signal. Also, the lower the first sampling frequency, the lower the power consumption when the audio processing chip 21 samples the original voice signal. Therefore, by lowering the first sampling frequency, the power consumed when the voice signal analysis device 20 executes signal sampling can be effectively reduced.

Figure 3:
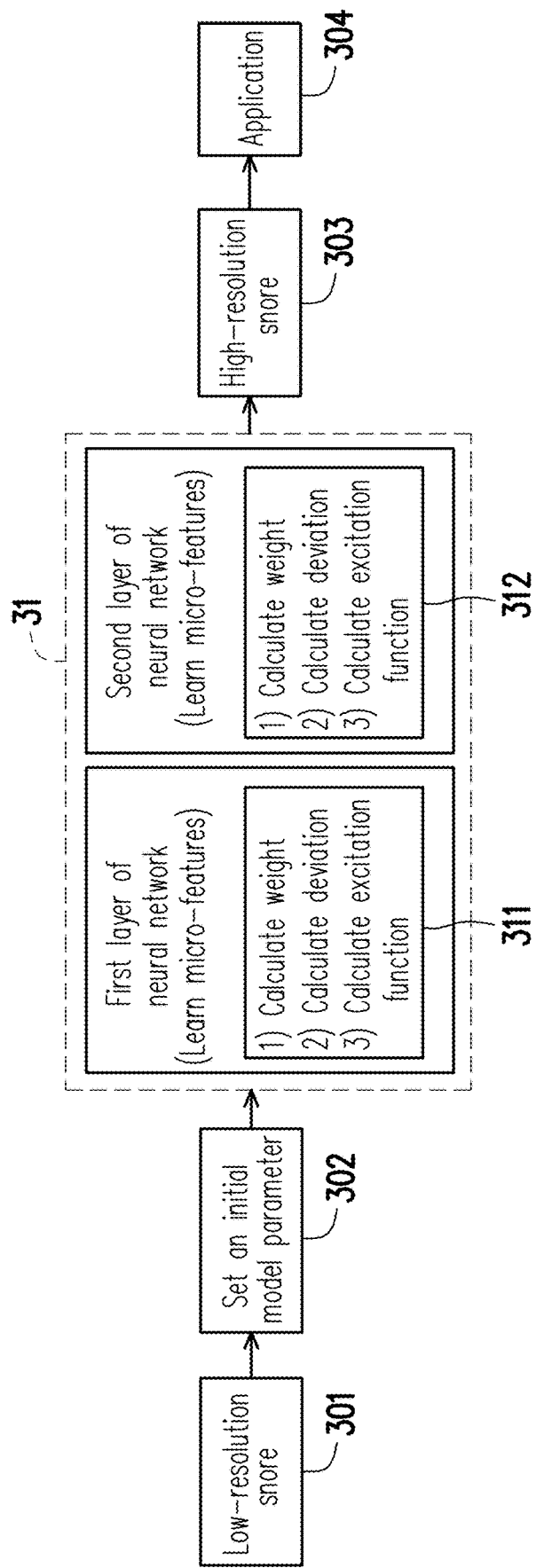
FIG. 3 is a schematic diagram illustrating a flow of recovering a high-resolution snore signal from a low-resolution snore signal according to an embodiment of the disclosure.

FIG. 3 is a schematic diagram illustrating a flow of recovering the high-resolution snore signal from the low-resolution snore signal according to an embodiment of the disclosure. Referring to FIG. 3, in Step 301, the low-resolution snore signal is obtained. In Step 302, the audio processing chip 21 may set the initial parameter (i.e., the initial model parameter) of the resolution recovery model 13 by using the dual-gradient learning generalization process. Then, the audio processing chip 21 may recover the high-resolution snore signal from the low-resolution snore signal through a resolution recovery model 31. For example, the process in which the resolution recovery model 13 processes the low-resolution snore signal may include increasing the resolution of the low-resolution snore signal. For example, the resolution recovery model 31 may include the resolution recovery model 13 of FIG. 1C or the resolution recovery model 24 of FIG. 2. Taking FIG. 1C as an example, the input signal 110 may include the low-resolution snore signal, and the output signal 130 may include the high-resolution snore signal. In Step 303, the audio processing chip 21 may obtain the high-resolution snore signal according to the output of the resolution recovery model 31. Then, in Step 304, the high-resolution snore signal may be used in various applications.

In an embodiment, the resolution recovery mode 31 may include a first layer 311 of a neural network and a second layer 312 of the neural network. The first layer 311 of the neural network layer and the second layer 312 of the neural network layer may sequentially process the low-resolution snore signal according to the initial model parameter set in Step 302. For example, the first layer 311 of the neural network layer may be used to execute micro-feature learning on the low-resolution snore signal, and the second layer 312 of the neural network layer may be used to execute macro-feature learning on the low-resolution snore signal. The resolution recovery model 31 may output the high-resolution snore signal according to the result of micro-feature learning and the result of macro-feature learning. The computation processes of the micro-feature learning and the macro-feature learning also include weight calculation, deviation calculation, and excitation function calculation, etc. Relevant operation details have been described above and will not be repeated in the following. Besides, the resolution recovery model 31 may further include a greater number of layers of neural network. Such number may be determined based on practical needs.

In an embodiment, after obtaining the high-resolution snore signal, the audio processing chip 21 may evaluate a respiratory condition of the target person according to a signal feature of the high-resolution snore signal. In addition, the audio processing chip 21 may compare the signal feature, such as waveform, of the second voice sampled signal to a signal feature template in a database, and evaluate the respiratory condition of the target person according to a comparison result. For example, when finding that the signal feature of the second voice sampled signal matches a specific signal template in the database, the audio processing chip 21 may generate evaluation information to reflect that the respiratory tract of the target person exhibits a specific symptom. For example, the evaluation information may reflect whether the target person suffers from a sleep apnea syndrome, whether the respiratory tract of the target person is obstructed, and/or the obstructed position of the respiratory tract of the target person, as well as information related to the respiratory condition of the target person. When the signal feature of the second voice sampled signal matches none of the signal feature templates in the database, the audio processing chip 21 may generate evaluation information to reflect that the respiratory tract of the target person is in healthy condition.

Specifically, the foregoing embodiments have described how to train the resolution recovery model 31 to facilitate the recovery accuracy of the resolution recovery model 31. Therefore, in the embodiment of FIG. 3, the resolution recovery model 31 may output the high-resolution snore signal close to or nearly the same as the original sound signal according to the low-resolution snore signal. Then, the signal feature of the high-resolution snore signal is analyzed to evaluate the respiratory condition of the target person, which is nearly equivalent to carrying out an analysis using the original voice signal of the target person. Accordingly, a balance is struck between lowering device power consumption and increasing detection accuracy.

The steps for reducing a chip size includes defining a target function, minimizing a total area, constraints (including device size, device pins, component arrangement), a random initial parameter, a heuristic algorithm, and a second-minimum total area may be rendered. However, it remains an issue to further design and reduce the chip size.

According to the embodiment of the disclosure, a relaxation rebuild branch method replaces the heuristic algorithm to obtain a minimum total area solution.

Figure 4:
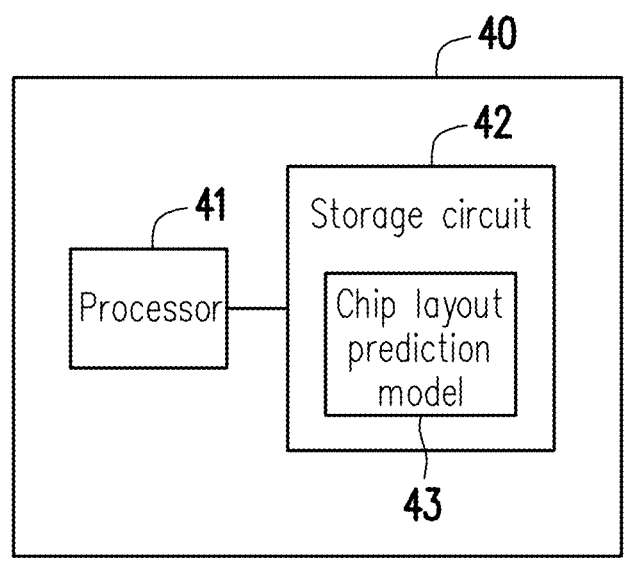
FIG. 4 is a schematic diagram illustrating a chip design device according to an embodiment of the disclosure.

FIG. 4 is a schematic diagram illustrating a chip design device according to an embodiment of the disclosure. Referring to FIG. 4, a chip design device 40 may include various electronic devices with a data processing function, such as a smart phone, a tablet computer, a notebook computer, a desktop computer, or a server. In addition, the types of the chip design device 40 are not limited thereto.

The chip design device 40 may include a processor 41 and a storage circuit 42. The processor 41 may handle the entirety or a portion of the operation of the chip design device 40. For example, the processor 41 may include a CPU, or a programmable microprocessor of common or specific usage, a DSP, a programmable controller, an ASIC, a PLD, other similar devices, or a combination thereof.

The storage circuit 42 is coupled to the processor 41. The storage circuit 42 is configured to store data. For example, the storage circuit 42 may include a volatile storage circuit and a non-volatile storage circuit. The volatile storage circuit is configured to store data in a volatile manner. For example, the volatile storage circuit may include a RAM or a similar volatile storage medium. The non-volatile storage circuit is configured to store data in a non-volatile manner. For example, the non-volatile storage circuit may include a ROM, an SSD, a HDD, or a similar non-volatile storage medium.

The storage circuit 42 may be configured to store a chip layout prediction model 43. The chip layout prediction model 43 may carry out a design by using a customized algorithm. As an example, the customized algorithm may include the relaxation rebuild branch method. The chip layout prediction model 43 is applicable at the chip design stage, and is able to reduce as much as possible the size of the audio processing chip 11 of FIG. 1A or the audio processing chip 21 of FIG. 2 according to basic chip design requirements (e.g., the device size required in the chip, the device pin, and the device component arrangement, etc.).

Figure 5:
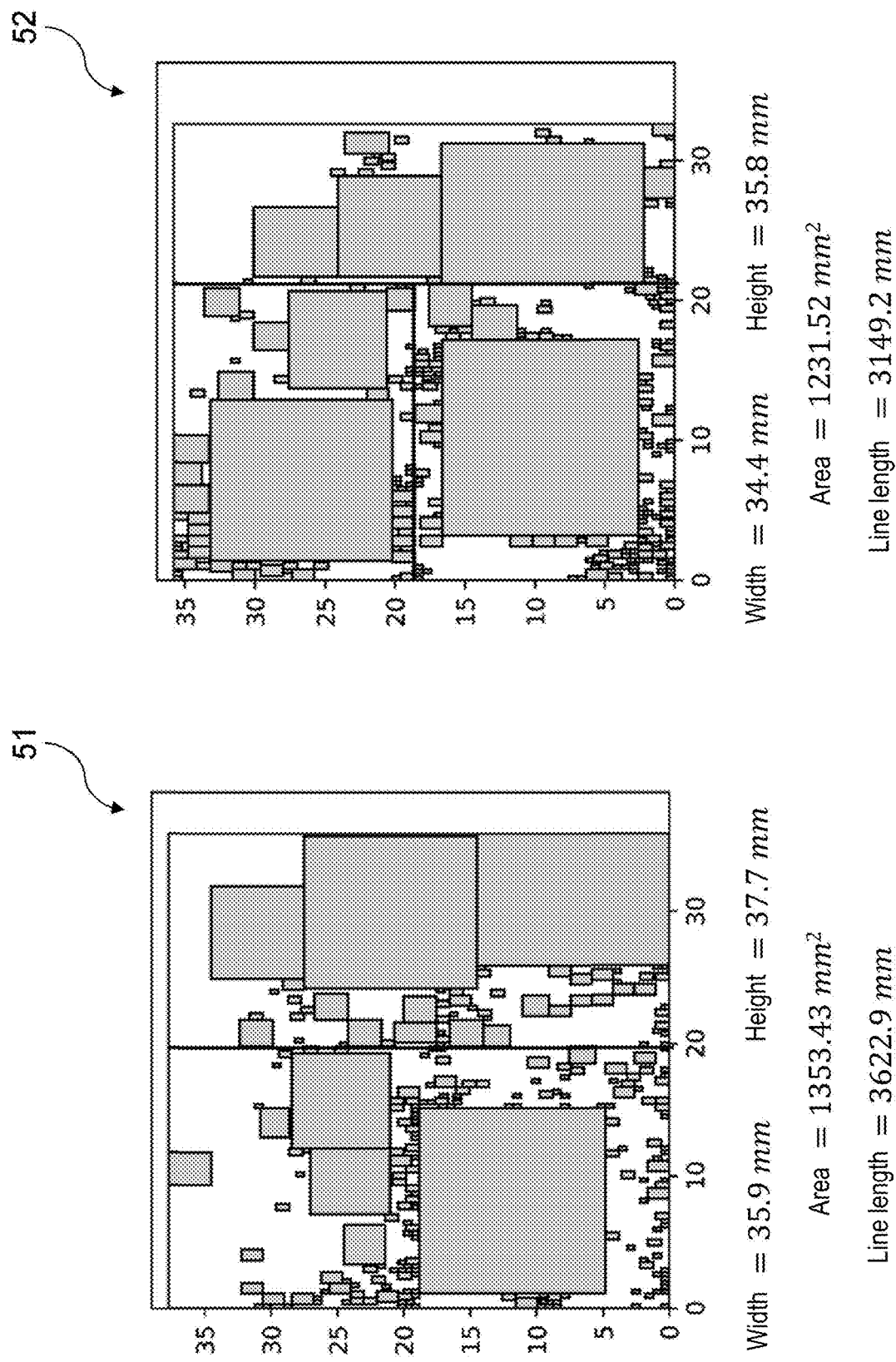
FIG. 5 is a schematic diagram illustrating reducing a chip size according to an embodiment of the disclosure.

FIG. 5 is a schematic diagram illustrating reducing a chip size according to an embodiment of the disclosure. Referring to FIG. 5, if the minimum size of a chip (e.g., an audio processing chip) is estimated by using the conventional heuristic algorithm, a possible layout region of the chip may include a region 51. For example, the width, height, area, and total line length of the region 51 may be 35.9 mm, 37.7 mm, 1353.43 mm$^2$, and 3622.9 mm, respectively.

Figure 6:
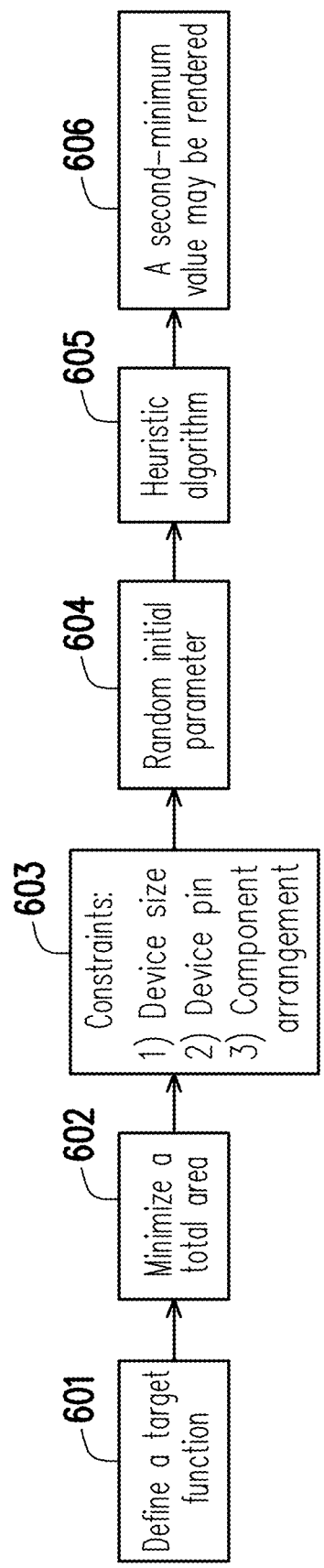
FIG. 6 is a schematic diagram illustrating a conventional process of looking for a minimum layout area of a chip by using a heuristic algorithm.

FIG. 6 is a schematic diagram illustrating a conventional process of looking for a minimum layout area of a chip by using a heuristic algorithm. Referring to FIG. 6, in Step 601, the target function is defined. For example, the minimum layout area of the chip may be found by solving the target function. In Step 602, it is attempted to look for the minimum layout area of the chip by using the target function. In Step 603, constraints are introduced to set up the basic chip design requirements (e.g., the device size required in the chip, the device pin, and the device component arrangement, etc.). In Step 604, a random initial parameter is set. In Step 605, the minimum layout area of the chip is found by using the heuristic algorithm. In Step 606, based on the heuristic algorithm of Step 605, the second-minimum chip total area, instead of the minimum chip total area, may be rendered.

Referring to FIG. 5 again, compared with FIG. 6 adopting the heuristic algorithm that may render the second-minimum chip total area, if the chip layout prediction model 43 adopting the relaxation rebuild branch method in FIG. 4 is used to look for the possible minimum size of the same chip (e.g., the audio processing chip), the minimum layout region of the chip may be reduced to a region 52 from the region 51. For example, the width, height, area, and total line length of the region 52 may be 34.4 mm, 35.8 mm, 1231.52 mm², and 3149.2 mm, respectively. However, the invention is not limited thereto.

Referring to FIG. 4 again, in the chip design stage, the processor 41 may run the chip layout prediction model 43 adopting the relaxation rebuild branch method and introduce the basic chip design requirements (e.g., the device size required in the chip, the device pin, and the device component arrangement, etc.). After introducing the basic chip design requirements, the chip layout prediction model 43 may execute model rebuilding according to multiple constraints and iteratively look for a chip layout design corresponding to the target chip (e.g., the audio processing chip 11 of FIG. 1A or the audio processing chip 21 of FIG. 2) through multiple decision paths. In addition, the chip layout design may be used to manufacture a target chip. In particular, the chip layout design may meet the (substantially) minimum layout area of the target chip.

Figure 7:
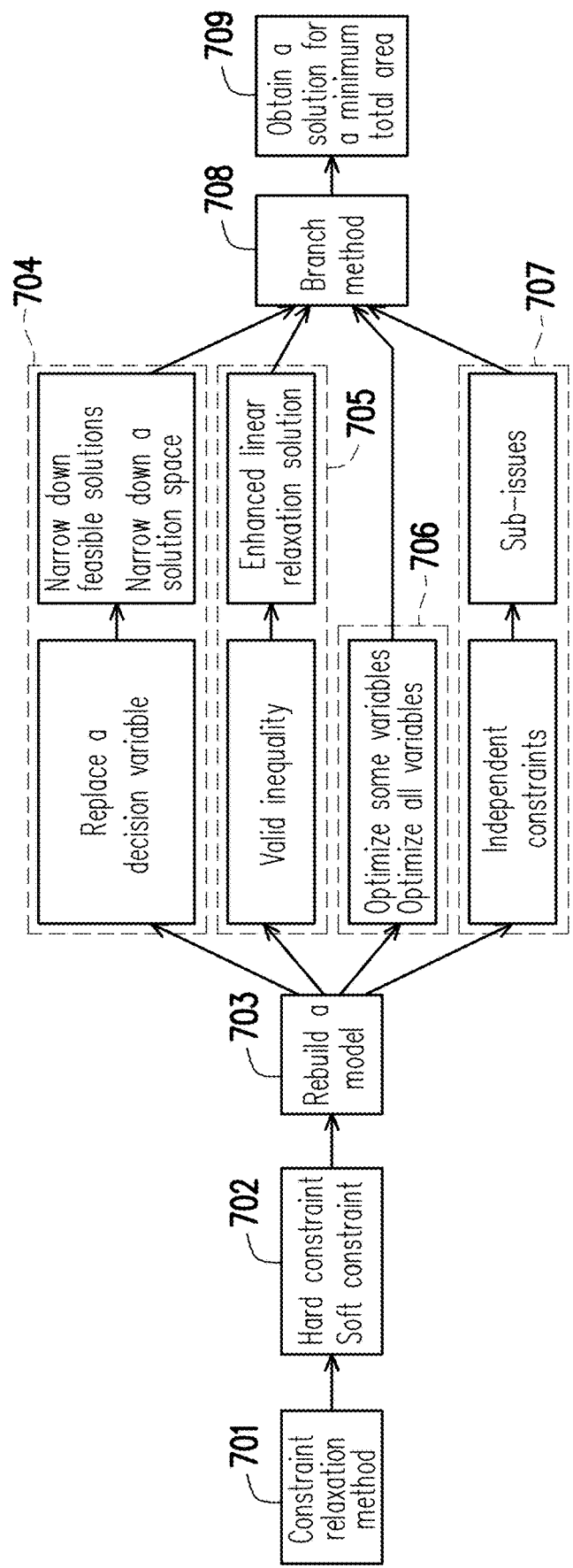
FIG. 7 is a schematic diagram illustrating a flow of a relaxation rebuild branch method according to an embodiment of the disclosure.

FIG. 7 is a schematic diagram illustrating a flow of a relaxation rebuild branch method according to an embodiment of the disclosure. Referring to FIGS. 4 and 7, in Step 701, at the chip design stage, the processor 41 may activate the relaxation rebuild branch method (also referred to as "constraint relaxation method"). In Step 702, the processor 41 may obtain a first-type constraint (also referred to as "hard constraint") and a second-type constraint (also referred to as "soft constraint") corresponding to the relaxation rebuild branch method. In Step 703, the processor 41 may execute model rebuilding according to the hard constraint and the soft constraint. Specifically, the hard constraint is required to be met during the process of model rebuilding, and the soft constraint is not necessarily met in the process of model rebuilding.

In the execution of model rebuilding, the processor 41 may rebuild a mathematical model adopted in default by the chip layout prediction model 43 according to the hard constraint and the soft constraint. For example, the processor 41 may modify the mathematical model adopted in default by the chip layout prediction model 43 into a new mathematical model. Compared with the mathematical model adopted in default by the chip layout prediction model 43, it is easier to find the optimal solution of the target function by using the new mathematical model. For example, the optimal resolution may include the solution for the minimum total area of the target chip (e.g., the length and the width of the target chip).

In an embodiment, the target function may be represented as Formula (2.1) as follows:

$$\alpha(H+W)+\beta\Sigma_e(R_e-L_e+U_e-D_e) \qquad (2.1)$$

In Formula (2.1), H represents the length of a carrier, W represents the width of the carrier, $R_e$ represents a right boundary position of an $e^{th}$ netlist, $L_e$ represents a left boundary position of the $e^{th}$ netlist, $U_e$ represents an upper boundary position of the $e^{th}$ netlist, and $D_e$ represents a lower boundary position of the $e^{th}$ netlist. Alternatively, from another perspective, $\alpha(H+W)$ may represent the sum of the length and the width of the carrier, and $\beta(R_e-L_e+U_e-D_e)$ may represent the line length of each netlist. By looking for a minimum solution set of Formula (2.1), the solution for the minimum total area of the target chip may be obtained.

In an embodiment, at least one of Formulae (3.1) to (3.8) in the following may be used with Formula (2.1):

$$X_i + (1 - r_i - r''_i)wid_i/2 + (r_i + r''_i)ht_i/2 \le W \qquad (3.1)$$

$$y_i + (1 - r_i - r''_i)ht_i/2 + (r_i + r''_i)wid_i/2 \le H \qquad (3.2)$$

$$r_i + r'_i + r''_i \le 1 \qquad (3.3)$$

$$x_i + (1 - r_i - r''_i)wid_i/2 + (r_i + r''_i)ht_i/2 + spc_{i,j} \le \qquad (3.4)$$
$$x_j - (1 - r_j - r''_j)wid_j/2 - (r_j + r''_j)ht_j/2 + M(z_{i,j} + z'_{i,j})$$

$$x_j + (1 - r_j - r''_j)wid_j/2 + (r_j + r''_j)ht_j/2 + spc_{i,j} \le \qquad (3.5)$$
$$x_i - (1 - r_i - r''_i)wid_i/2 - (r_i + r''_i)ht_i/2 + M(1 - z_{i,j} + z'_{i,j})$$

$$y_i + (1 - r_j - r''_j)ht_i/2 + (r_i + r''_i)wid_i/2 + spc_{i,j} \le \qquad (3.6)$$
$$y_j + (1 - r_j - r''_j)ht_i/2 + (r_j + r''_j)wid_j/2 + M(1 + z_{i,j} + z'_{i,j})$$

$$y_i + \frac{(1 - r_j - r''_j)ht_j}{2} + \frac{(r_j + r''_j)wid_j}{2} + spc_{i,j} \le \qquad (3.7)$$
$$y_j + (1 - r_i - r''_i)ht_i/2 + (r_i + r''_i)wid_i/2 + M(2 - z_{i,j} + z'_{i,j})$$

$$L_e \le x_i + (1 - r_i - r'_i - r''_i)dx^0 + r_i dx + r'_i dx' + r''_i dx'' \qquad (3.8)$$

$$R_e \ge x_i + (1 - r_i - r'_i - r''_i)dx^0 + r_i dx + r'_i dx' + r''_i dx''$$

$$D_e \le x_i + (1 - r_i - r'_i - r''_i)dy^0 + r_i dy + r'_i dy' + r''_i dy''$$

$$U_e \ge x_i + (1 - r_i - r'_i - r''_i)dy^0 + r_i dy + r'_i dy' + r''_i dy''$$

In Formulae (3.1) to (3.8), $x_i$ represents the X-axis position of a central point of a device i, $y_i$ represents the Y-axis position of the central point of the device i, $z_{ij}$ and $z'_{ij}$ represent relative positions between the devices i and j, $r_i$ represents whether the device i is rotated 90 degrees, $r'_i$ represents whether the device i is rotated 180 degrees, and $r''_i$ represents whether the device i is rotated 270 degrees.

After model rebuilding is completed, the processor 41 may execute the branch method through multiple decision paths corresponding to Steps 704 to 707 to iteratively look for the solution for the minimum area of the chip layout design corresponding to the target chip. In particular, the multiple decision paths corresponding to Steps 704 to 707 each correspond to an alternative solution-finding rule for finding the solution for the target function. In Step 709, the processor 41 may obtain the solution for the minimum total area.

Specifically, in the decision path corresponding to Step 704, the processor 41 may replace some decision variables in the chip layout prediction model 43, such as integrating or splitting at least some unknown decision variables (i.e., replacing decision variables). Then, the processor 41 may narrow down feasible solutions or the solution space of the mathematical model adopted by the chip layout prediction model 43 in attempt to urge the solution of the target function (i.e., narrowing down feasible solutions/reducing the solution space).

In the decision path corresponding to Step 705, the processor 41 may modify some inequalities in the chip layout prediction model 43 into equalities with the same or similar meanings and look for solutions (i.e., generating valid inequalities) by using a relaxation variable. Then, the processor 41 may loosen the limitation of being "0" or "1" in some variables into being between "0" and "1" in attempt to urge the solution of the target function (i.e., obtaining an enhanced linear relaxation solution).

In the decision path corresponding to Step 706, the processor 41 may optimize some or all of the variables in the chip layout prediction model 43, such as choosing some or all of the variables to look for a solution or adjust variable values, in attempt to urge the solution of the target function (i.e., optimizing some or all of the variables).

In the decision path corresponding to Step 707, the processor 41 may combine some independent constraints in the chip layout prediction model 43 with the target function to generate sub-issues (i.e., independent constraints). Then, the processor 41 may decompose the mathematical model adopted in the chip layout prediction model 43 into multiple sub-issues and derive the solution of the original issue (i.e., the target function) according to the solutions of the sub-issues in attempt to urge the solution of the target function (i.e., looking for the solutions of the sub-issues). Depending on practical needs, there may be a greater or fewer number of the decision paths. In addition, the contents of the decision paths may also be adjusted based on practical needs. The disclosure is not particularly limited in this regard.

In Step 708, in the process of looking for the solution of the target function, the processor 41 may combine and optimize the decision paths corresponding to Steps 704 to 707 by using the branch method. For example, the processor 41 may execute iterative search according to the branch method, and look for the solution through different branch variables and/or sub-issues in the decision paths. The optimal solution of the target function that is eventually obtained is the solution for the minimum total area. The solution for the minimum total area may reflect the minimum layout area of the target chip (e.g., the length and the width of the target chip) of the target chip derived from the chip layout prediction model 43. From another perspective, the relaxation rebuild branch method shown in FIG. 7 may replace the conventional heuristic algorithm in Step 605 of FIG. 6 to thereby further reduce the chip layout area.

In an embodiment, after obtaining the (substantially) minimum layout area (or the chip layout design) of the target chip, the processor 41 may provide the chip layout design to the chip manufacturing department or the chip manufacturer of the next stage to set a plan for and manufacture the target chip. In particular, for the type of device whose device size needs to be reduced as much as possible, such as a wireless earphone, if the size of the audio processing chip therein is able to be effectively reduced, the design flexibility of the wireless earphone and the comfort when a user wears the wireless earphone are greatly facilitated.

Figure 8:
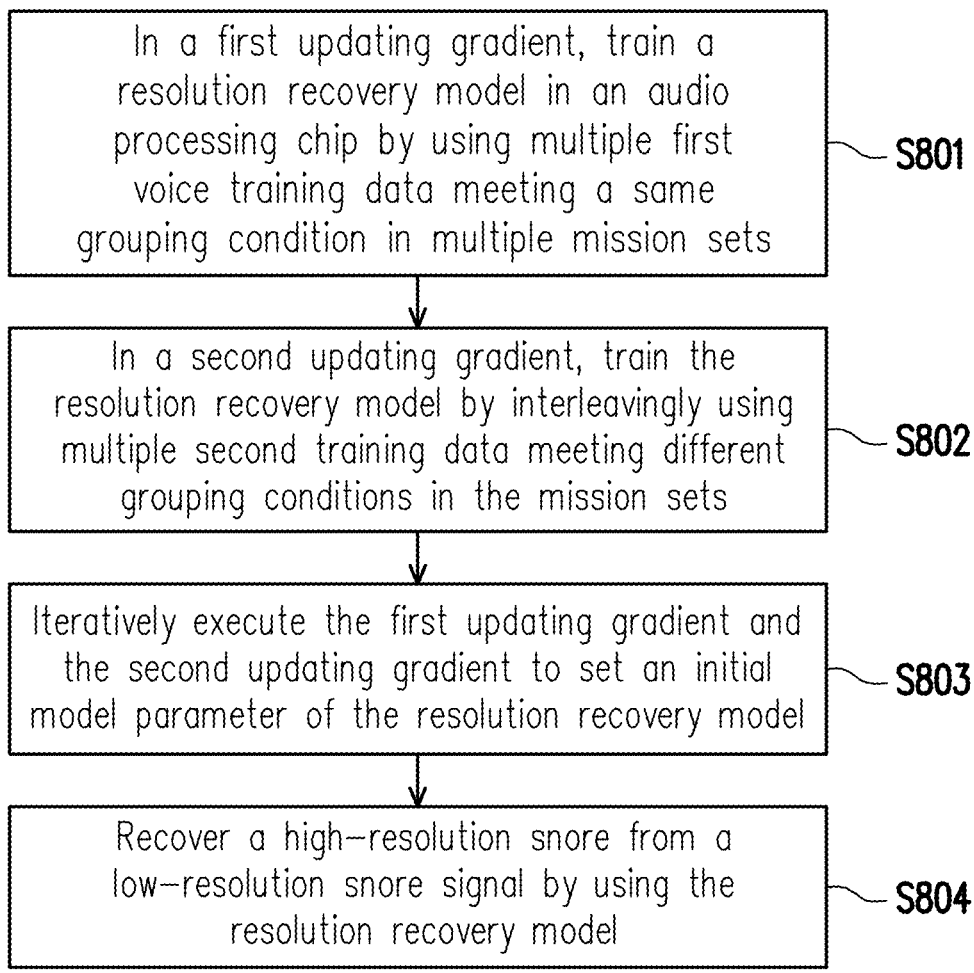
FIG. 8 is a flowchart illustrating a voice signal analysis method according to an embodiment of the disclosure.

FIG. 8 is a flowchart illustrating a voice signal analysis method according to an embodiment of the disclosure. Referring to FIG. 8, in Step S801, in the first updating gradient, the resolution recovery model in the audio processing chip is trained by using multiple first voice training data meeting the same grouping condition in the mission sets. In Step S802, in the second updating gradient, the resolution recovery model is trained by interleavingly using multiple second voice training data meeting different grouping conditions in the mission sets. In Step S803, the first updating gradient and the second updating gradient are iteratively executed to set the initial model parameter of the resolution recovery model. In Step S804, the high-resolution snore signal is restored from the low-resolution snore signal by using the resolution recovery model. The resolution of the low-resolution snore signal is lower than the resolution of the high-resolution snore signal.

Figure 9:
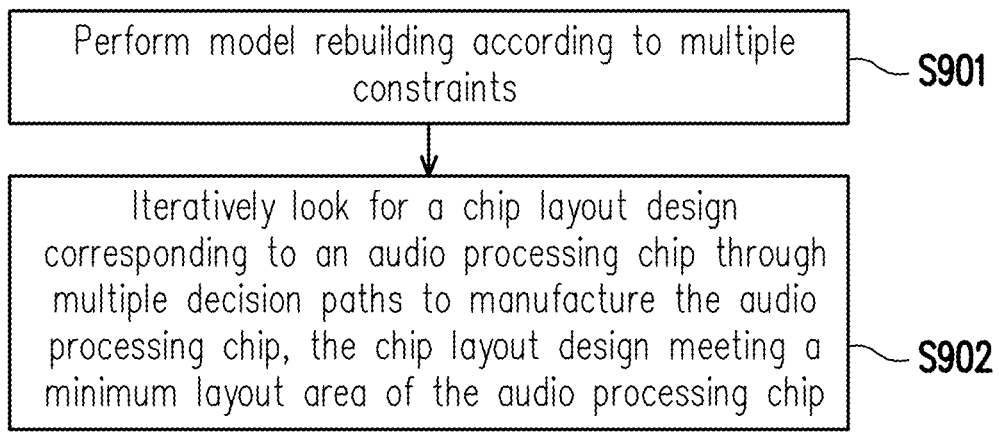
FIG. 9 is a flowchart of a chip design method according to an embodiment of the disclosure.

FIG. 9 is a flowchart of a chip design method according to an embodiment of the disclosure. Referring to FIG. 9, in Step S901, model rebuilding is executed according to multiple constraints. In Step 902, the chip layout design corresponding to the audio processing chip is found iteratively through multiple decision paths to manufacture the audio processing chip. In addition, the chip layout design meets the minimum layout area of the audio processing chip.

It is noted that details of the respective steps in FIGS. 8 and 9 have been described above and therefore will not be repeated in the following. The respective steps in FIGS. 8 and 9 may be implemented as programming codes or circuits. The disclosure is not particularly limited in this regard. In addition, the methods in FIGS. 8 and 9 may be used together with or independently from the exemplary embodiment. The disclosure is not particularly limited in this regard.

Based on the above, by setting the initial parameter of the resolution recovery model in the audio processing chip by using different updating gradient mechanisms in different updating gradients, the accuracy of the resolution recovery model in recovering the resolution of a voice sampled signal is effectively facilitated. In addition, through customized model rebuilding and the relaxation rebuilding branch technique with multiple decision paths, it is easy for the chip layout prediction model to find the minimum layout area of the audio processing chip.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A voice signal analysis method, comprising:
   in a first updating gradient, training a resolution recovery model in an audio processing chip by using a plurality of first voice training data meeting a same grouping condition in a plurality of mission sets;
   in a second updating gradient, training the resolution recovery model by interleavingly using a plurality of second voice training data meeting different grouping conditions in the mission sets;
   iteratively executing the first updating gradient and the second updating gradient to set an initial model parameter of the resolution recovery model; and
   recovering a high-resolution snore signal from a low-resolution snore signal by using the resolution recovery model, wherein a resolution of the low-resolution snore signal is lower than a resolution of the high-resolution snore signal.

2. The voice signal analysis method as claimed in claim 1, wherein the low-resolution snore signal corresponds to a first sampling frequency, the high-resolution snore signal corresponds to a second sampling frequency, and the second sampling frequency is higher than the first sampling frequency.

3. The voice signal analysis method as claimed in claim 1, wherein recovering the high-resolution snore signal from the low-resolution snore signal by using the resolution recovery model comprises:
   executing micro-feature learning on the low-resolution snore signal by using a first layer of a neural network in the resolution recovery model;
   executing macro-feature learning on the low-resolution snore signal by using a second layer of the neural network in the resolution recovery model; and generating the high-resolution snore signal according to a result of the micro-feature learning and a result of the macro-feature learning.

4. The voice signal analysis method as claimed in claim 1, further comprising:
at a chip design stage, executing model rebuilding according to a plurality of constraints by a chip layout prediction model, and iteratively looking for a chip layout design corresponding to the audio processing chip through a plurality of decision paths, so as to manufacture the audio processing chip,
wherein the chip layout design meets a minimum layout area of the audio processing chip.

5. The voice signal analysis method as claimed in claim 4, wherein the constraints comprise a hard constraint and a soft constraint, the hard constraint is required to be met during the model rebuilding, and the soft constraint is not necessarily met during the model rebuilding.

6. The voice signal analysis method as claimed in claim 5, wherein the decision paths each correspond to an alternative solution-finding rule for finding a solution of a target function.

7. A voice signal analysis device, comprising:
an audio processing chip, in which a resolution recovery model is built; and
a storage circuit, coupled to the audio processing chip and configured to store a plurality of mission sets,
wherein the audio processing chip is configured to:
in a first updating gradient, train the resolution recovery model by using a plurality of first voice training data meeting a same grouping condition in the mission sets;
in a second updating gradient, train the resolution recovery model by interleavingly using a plurality of second voice training data meeting different grouping conditions in the mission sets;
iteratively execute the first updating gradient and the second updating gradient to set an initial model parameter of the resolution recovery model; and
recover a high-resolution snore signal from a low-resolution snore signal by using the resolution recovery model, wherein a resolution of the low-resolution snore signal is lower than a resolution of the high-resolution snore signal.

8. The voice signal analysis device as claimed in claim 7, wherein the low-resolution snore signal corresponds to a first sampling frequency, the high-resolution snore signal corresponds to a second sampling frequency, and the second sampling frequency is higher than the first sampling frequency.

9. The voice signal analysis device as claimed in claim 7, wherein an operation in which the audio processing chip recovers the high-resolution snore signal from the low-resolution snore signal comprises:
executing micro-feature learning on the low-resolution snore signal by using a first layer of a neural network in the resolution recovery model;
executing macro-feature learning on the low-resolution snore signal by using a second layer of the neural network in the resolution recovery model; and
generating, by the resolution recovery model, the high-resolution snore signal according to a result of the micro-feature learning and a result of the macro-feature learning.

* * * * *